Dec. 4, 1934.  C. A. THOMAS ET AL  1,982,708
RESIN FROM PETROLEUM HYDROCARBONS
Filed March 16, 1932
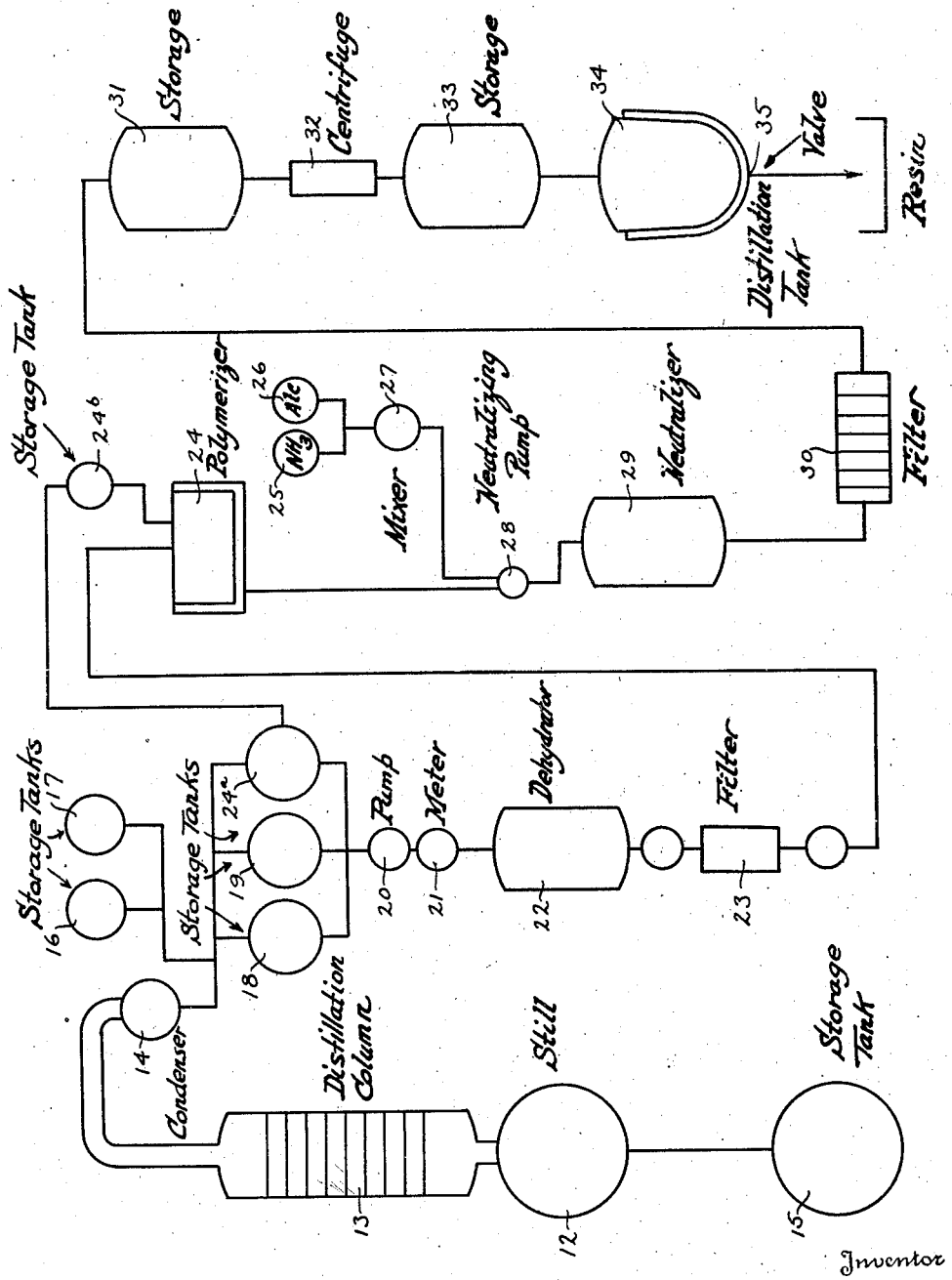
Inventor
Charles A Thomas
William H Carmody
By Maréchal & Noe
Attorney Patented Dec. 4, 1934

1,982,708

UNITED STATES PATENT OFFICE

1,982,708

RESIN FROM PETROLEUM HYDROCARBONS

Charles A. Thomas and William H. Carmody, Dayton, Ohio, assignors to Dayton Synthetic Chemicals, Inc., Dayton, Ohio, a corporation of Ohio Application March 16, 1932, Serial No. 599,161

14 Claims. (Cl. 260—2)

This invention relates to synthetic resins and to methods of producing such resins.

One of the principal objects of this invention is to provide a synthetic resin of improved and controlled character and to provide improved methods of producing such resin from petroleum hydrocarbons.

Another object of this invention is to provide a useful synthetic resin from an insoluble by-product obtained in the production of resins from unsaturated hydrocarbons, and a method of producing such a useful resin.

Other objects and advantages of the invention will be apparent from the following description when taken in connection with the accompanying drawing and appended claims.

The single view of the drawing is a diagrammatic representation of a plant flow sheet showing a preferred method of plant production of the resin of the present invention.

Reference is herein made to the patent of Charles A. Thomas and Carroll A. Hochwalt, No. 1,836,629, dated December 15, 1931; and to the copending applications of Carroll A. Hochwalt, Serial No. 461,799, filed June 17, 1930; Charles A. Thomas, Serial No. 461,807, filed June 17, 1930; Charles A. Thomas, Serial No. 518,132, filed February 25, 1931; Charles A. Thomas, Serial No. 494,692, filed November 10, 1930; Charles A. Thomas, Serial No. 526,578, filed Mar. 30, 1931; Charles A. Thomas, Serial No. 482,157, filed Sept. 15, 1930; and Charles A. Thomas, Serial No. 528,706, filed April 8, 1931, which disclose resins of this general character and methods of making the same.

In the practicing of this invention unsaturated hydrocarbon compounds are caused to react in the presence of a suitable catalyst or activating agent, such as anhydrous aluminum chloride, to produce by polymerization and reaction an amorphous, resinous reaction product of high molecular weight. In carrying out this invention unsaturated hydrocarbon compounds from various sources may be used. Relatively pure hydrocarbon compounds, such as diolefines and olefines, or cyclic diolefines and cyclic olefines, or diolefines and substituted benzene hydrocarbons, or terpenes, or mixtures of these, may be reacted together in controlled proportions to produce resins of predetermined characteristics. Indeterminate mixtures of unsaturated hydrocarbons may also be reacted in this manner. Thus, cracked petroleum distillate or special fractions of cracked distillate may be used. Certain fractions or cuts of cracked distillate may also be mixed in varying proportions, and varying proportions of relatively pure unsaturated hydrocarbons of any or all of the classes mentioned above, may be mixed with certain fractions of cracked distillate, to provide satisfactory starting materials for the resin formation. Very satisfactory resins have been produced from a fraction of cracked distillate distilling between 25° C. and 180° C. This fraction has been found to comprise in varying proportions, olefines and diolefines, such as isoprene and amylene and their homologues; cyclic olefines and diolefines such as cyclohexadiene, cyclohexene, methyl cyclohexadiene and their homologues; and substituted benzene hydrocarbons, such as toluene and xylene. Certain fractions or cuts obtained from this fraction of cracked distillate have also been found to produce desirable resins. Thus a fraction of cracked distillate boiling between 25 and 50° C. (hereinafter referred to as fraction No. 1), and a fraction boiling between 125 and 180° C. (hereinafter referred to as fraction No. 4), used together in varying proportions have been found to produce a desirable resin according to this invention.

Fraction No. 1 has been found to comprise among the active resin-forming materials present, a mixture of $C_5H_8$ and $C_5H_{10}$ hydrocarbons, that is, straight chain olefines and diolefines. A varying proportion of $C_5H_6$ compounds, that is, cyclic diolefines such as cyclo pentadiene, is also usually present in this fraction. This fraction is found to be very rich in diolefines.

Fraction No. 4 contains a large proportion of hydrocarbons of the $C_{10}H_{12}$ series, that is, polymers of cyclic diolefines, plus also some polymers of the lower straight chain olefines and diolefines and cyclic olefines. Some unsaturated substituted benzene hydrocarbons are found to be present, together with some xylene, toluene and cymene.

As an example of the carrying of this invention into effect the following procedure is described, using the two fractions of cracked distillate specified and described above as fraction No. 1, and fraction No. 4.

A crude fraction of highly unsaturated cracked distillate, the freshly cracked distillate having an end boiling point of 180° C., is first fractionated in the ordinary manner to produce the desired special cuts or fractions. Since this crude fraction has been found to contain relatively large proportions of diolefines, and since it is known that diolefines are easily polymerized on subjection to heat, considerable care is desirable in this fractionation to prevent the formation of undesirable diolefine polymers. In the case of the higher boiling fractions fractionation is preferably carried out under a vacuum and with the liquid temperature as low as possible in order to prevent prepolymerization of the unsaturated hydrocarbons. Referring to the accompanying drawing this fractionation may be carried out in a conventional still 12, having a distillation column 13 and condensing apparatus 14. The still is supplied with crude distillate from a storage tank 15. Any fractions which are not desired for immediate use in the resin process are taken off to storage tanks 16 and 17. The cuts desired to be used in the resin reaction are separated and stored in storage tanks 18 and 19. These storage tanks are suitably connected with a pump 20, for forcing the liquid through the system and with a meter 21 for measuring and regulating the supply of materials.

It has been found that in resin production according to this invention it is desirable that the resin-forming materials be substantially completely anhydrous. It has accordingly been found desirable to treat the hydrocarbon starting materials, such as cracked distillate, to remove water before beginning the polymerization reaction. This may conveniently and effectively be accomplished by passing the fractions of cracked distillate through a dehydrating operation, such as treating the distillate with a suitable dehydrating agent. Calcium chloride has been found to be a most economical and effective dehydrating agent. The dehydrator 22 consists of a storage tank fitted with an agitating mechanism. The mixture of liquid hydrocarbons such as cracked distillate is passed through the tank, the agitator being run for alternate short periods, such as 2 minutes, then the agitator being stopped and the calcium chloride allowed to settle down through the mixture of liquid hydrocarbons. In this manner the dehydrating agent is brought into uniform contact with the liquid hydrocarbons. The procedure of alternate running and stopping of the agitating mechanism is continued until the material is found to be substantially dry, as determined by the anhydrous copper sulfate test. While this procedure has been found simple and effective, any suitable dehydrating process may be used.

Such dehydrating treatment renders it desirable that the small particles of calcium chloride be removed before the beginning of the polymerizing or resin-forming process, since the presence of calcium chloride during the polymerizing process appears to be objectionable, tending to produce a darker and less desirable resin. Consequently the dehydrated liquid is pumped through a filter 23, or the calcium chloride particles may be removed in any other suitable manner.

The mixture of unsaturated hydrocarbons after being thoroughly dried as described and freed from calcium chloride or other dehydrating agent, is run into polymerizing vessel 24. Various proportions of the two described fractions of cracked distillate may be used, depending on the particular type of resin desired. By way of example, to produce a resin particularly suitable for varnish making the following proportions may be used; 1 part by volume of fraction No. 1, to 2 parts by volume of fraction No. 4. To about 560 gallons of this mixture in the polymerizer, an excess of dry inert solvent or diluent, such for example as benzol or saturated gasoline, is added in any convenient manner, as from the storage tank 24$^a$.

The amount of solvent used may conveniently be about one part of volume of diluent to 1 part of cracked distillate mixture. For example, with the amount specified, about 560 gallons of solvent are added. The inert solvent is added to this mixture primarily for convenience in plant operation, such as to give a freely flowable mixture during polymerization to assist in mixing, to afford better contact of the catalyst and for other reasons, and any desired proportion of solvent may be used.

The particular solvent used will depend somewhat upon the type of resin desired. The solvent used should be preferably chemically inert toward the aluminum chloride catalyst, but it should be at the same time a good solvent for the hydrocarbon-aluminum chloride complex, which is formed when aluminum chloride is added to unsaturated hydrocarbons. Hexane or substantially completely saturated gasoline, have been found to be more completely inert than benzol, and for the production of very light colored types of resin their use may be desirable. Lower boiling solvents also appear to produce lighter resins as such solvents can be removed at a lower temperature.

The polymerizing vessel may be of any desired conventional type, and consists of a kettle of the desired size equipped with an agitator and an efficient cooling system, such as a water jacket. The polymerizer may be also equipped with a reflux condenser, not shown, which is open to atmosphere but protected, as by a calcium chloride tube, against the entrance of water vapor into the polymerizer. The catalyst, such as anhydrous aluminum chloride, is added to the mixture of unsaturated hydrocarbons in the polymerizer in any convenient manner, such as from the storage 24$^b$. The aluminum chloride is preferably pulverized to give better contact. It has also been found that when the catalyst is first added in powdered form to the inert diluent, such as gasoline or benzol, a suspension appears to be formed, which is comparable to an emulsion. There appears to be no reaction between the aluminum chloride catalyst and the inert diluent or solvent. However, by the addition to the unsaturated hydrocarbon mixture of aluminum chloride in such a suspension, almost molecular contact appears to be obtained between the catalyst and the reactive materials. This also provides a convenient method for the addition of aluminum chloride in small quantities at a time. The aluminum chloride may, however, be conveniently added separately in solid or powdered form, in small quantities at a time. For example, a small continuous stream of catalyst may be poured into the polymerizer. With the first addition of aluminum chloride there is a rather active chemical reaction with a resultant rise in temperature. It is desirable to control the temperature of the reacting mass, the cooling mechanism being utilized for this purpose. The agitator is maintained at a good rate of speed during the addition of the aluminum chloride. Rapid agitation allows a more effective distribution of catalyst and more rapid polymerization. It is found that the resin tends to become darker the longer it is left in contact with the catalyst. Accordingly, rapid agitation hastens the polymerization reaction, shortens the time of contact of the reaction mixture with the catalyst, and tends to produce a lighter colored resin. The temperature of the reaction is usually held below 35° C. Where a polymerizing vessel at atmospheric pressure is used it is desirable that the temperature should not be permitted to rise much above 40° C. Otherwise the polymerizing vessel should be kept under pressure to prevent undue volatilization and loss of resin-forming hydrocarbons. Polymerization at higher temperatures, such as above 65° C. requires a special pressure vessel.

The addition of aluminum chloride is continued with continuous agitation until the desired amount of catalyst has been added. However, if the temperature in the polymerizer rises above 40° C., the rate of addition of catalyst is preferably reduced until the reaction mixture has been cooled below 40° C. The amount of aluminum chloride used has been found to materially affect the characteristics of the resin produced, such for example as iodine value, color and hardness. The yield of the resin is also materially affected by the amount of catalyst used. Accordingly, the proportion of catalyst will vary according to the particular type of resin desired, and the yield required in plant operation. As polymerization continues, the iodine value of the resultant resin drops in proportion to the amount of catalyst added, and the yield increases in proportion to the amount of catalyst added, until a point is reached where the iodine value and yield are both relatively constant. For many types of resins this point is the one where the polymerization is considered complete. In order to produce a resin having iodine value of more than 175, it has been found that not more than 0.5 gram of catalyst per 100 cc. of unsaturated hydrocarbons will usually be required. However, to produce a maximum yield, the amount of catalyst used may be from 1 to 5 grams per 100 cc. of unsaturated hydrocarbons, about 3 grams per 100 cc. being an average proportion. In the particular example given above the amount of aluminum chloride added for the quantities given was approximately 140 pounds, or approximately 3.4 grams per 100 cc. of unsaturated hydrocarbons.

The quantity of catalyst needed for producing desired results as to yield and iodine number of the finished resin, can be readily determined by test for the particular ingredients being treated and the production conditions in use so that the required amount can be used in regular plant production.

In addition to anhydrous aluminum chloride, other compounds which hydrolyze in water to give an acid reaction will function satisfactorily to cause conversion of the unsaturated hydrocarbons into resin, for example, halides of iron, boron, zinc, antimony, indium, titanium, tin, and ethyl sulfate and aniline hydrobromide.

The resulting resinous reaction product is a viscous mass, dark in color. This material is now neutralized to terminate the polymerizing reaction. Various water soluble alkalies may be used for this neutralization, but preferably ammonia is employed, as an excess of this material can readily be removed by distillation, and it appears to have no injurious effects upon the resulting resin. The neutralizing treatment is preferably carried out in the presence of an organic hydroxy compound which assists in the decomposition of the aluminum chloride complex and the precipitation of the aluminum chloride or other catalyst present. An alcohol, such as ethyl alcohol, functions very satisfactorily for this purpose. Thus a mixture of about 40 percent by volume of ammonium hydroxide containing 28% NH$_3$ by weight, and 60% by volume of 95% ethyl alcohol gives good results. A calculated excess of the neutralizing mixture is added. With the quantities specified above, that is, about 560 gallons of unsaturated hydrocarbons, about 70 gallons of the neutralizing mixture are used. It has been found, particularly when dealing with large volumes of unsaturated hydrocarbons, that when the neutralizing liquid is added directly to the total mass of the polymerized mixture, the neutralizing agent is not in excess until all or nearly all of the neutralizing liquid has been added. Consequently the first portion of the neutralizing liquid added neutralizes only a portion of the polymerized mixture, and the water which enters as a part of the neutralizing liquid appears to affect the unneutralized portion of the reaction mixture, tending to produce a darker resin. Where it is practicable, it appears that the polymerized mixture can be added to the neutralizing liquid in practically any volume or any rate, thereby providing at all times an excess of the neutralizing liquid in contact with the added polymerized mixture. A device such as the neutralizing pump 28, has been found convenient for the neutralizing operation. This device is an ordinary pump into which two streams of material flow, one being the resinous reaction product from the polymerizer, the other the neutralizing liquid. This neutralizing liquid may be stored and mixed in a container 27 suitably connected with a storage tank for ammonia 25, and for alcohol 26. The resinuos reaction product and the neutralizing liquid are prevented from coming in contact until they enter the pump simultaneously. Neutralization is practically completed in the pump and in the short length of pipe beyond. This neutralization in small volume produces a lighter colored resin. It is found, however, that there may be small particles of solid catalyst which have passed through the pump without complete neutralization. Neutralization may desirably therefore, be completed in a neutralizing vessel 29. This vessel consists of any suitable container in which the resinous reaction product is agitated with the neutralizing liquid. Any suitable device may be used to carry out the neutralization process. However, it appears to be desirable that an excess of neutralizing liquid be present at all times during the neutralization reaction, so as to avoid the presence of water in contact with the unneutralized reaction product. The neutralization is accompanied by a color change, the reaction mass changing from a black or dark red to a pale amber or yellow as the neutralization is completed. A granular precipitate of the catalyst is produced which is readily removed by filtration; for example, where aluminum chloride is used, a precipitate consisting for the most part of aluminum hydrates is formed. Complete neutralization is desirable since any particles of unneutralized catalyst may be partly dissolved during the washing of the precipitate and thus allowed to pass through into the resin solution.

When reacting in this manner unsaturated hydrocarbons including olefines and diolefines, it is found that two products are formed, one being an amorphous resinous compound readily soluble in benzol, gasoline and hydrocarbon solvents, and another being a white gelatinous organic polymer substantially completely insoluble in such solvents. This insoluble compound is carried down with the precipitate of aluminum hydrates described above. Complete solution of the soluble resinous product is insured by the presence of the inert diluent or solvent, such as benzol or gasoline, with the reaction mixture of unsaturated hydrocarbons. The described treatment and agitation in the neutralizer produce a granular precipitate which is readily filterable. This neutralized mass containing the precipitated catalyst and the insoluble polymer is then passed through a conventional filter press 30 to remove the solid particles. The filtered sludge contains the precipitated catalyst, ammonium chloride and the insoluble polymer.

Aluminum oxide and ammonium chloride may be recovered as by-products from this sludge. The insoluble polymer may also be purified and further treated to produce a useful resin, in the manner hereinafter described. In place of the filter press shown, a suitable type of centrifuge may be used if desired. The solid constituents are usually not completely removed by passage through the first filter press. Accordingly the mixture may be stored as in tank 31 and passed from storage through a centrifuge 32.

It will be obvious that at this point some water from the neutralizing liquid will remain in the filtered and centrifuged solution of the resinous reaction product. Ammonium chloride may be dissolved in such water, and has been found to be objectionable if allowed to remain and contaminate the finished resin. Removal of this water and any materials in solution therein, may be conveniently and simply accomplished by passing the resin solution into storage such as tank 33, and allowing the water to separate and settle to the bottom of the tank. The resin solution is then drained from a point on the side of the vessel above the water layer and passed into the distillation vessel 34. The water layer may be drawn off from the bottom of tank 33 from time to time as desired.

Distillation tank 34 may be any suitable type of jacketed distillation vessel equipped with stirring apparatus and apparatus for steam distillation. The distillation vessel is preferably constructed of a suitable non-contaminating material, glass-lined vessels having been found very satisfactory. It has been found that the use of iron distillation vessels may result in contamination and discoloration of the resulting resin product. The resin solution is heated by means of the jacket, the temperature of the molten resin being allowed to rise to the endpoint of the solvent or diluent used. The solvent is thus removed and may be recovered by a conventional condensing system, not shown.

The resin at this point is a very viscous fluid. If desired, the concentration of the resin may be controlled so as to leave any desired amount of solvent in the resin so that it may be maintained in solution form. Such a resin solution may be withdrawn to storage and used directly if desired. If a solid or hard resin is desired the distillation is continued until substantially all the readily volatile solvents have been driven off. Depending on the degree of hardness or the type of resin desired, the resin may be treated with steam or super-heated steam. When steam or super-heated steam is blown through the molten mass of resin, high boiling oily polymers are removed and a harder resin is produced. When the resin is treated with steam which has not been preheated, an appreciable amount of water is condensed in the resin, and is occluded in the hardened resin unless driven off by continued heating of the resin after steam treatment is discontinued. When super-heated steam is used, very little water is condensed in the mass. Moreover, the time required for steam treatment may be shortened by use of super-heated steam. With the distillation vessel shown and the amount of material specified, super-heated steam at 175° C. and 10 pounds pressure gives very satisfactory results. The temperature of the resin during this reaction was approximately 155 to 160° C. This steam distillation is carried on until the desired endpoint is reached. When a varnish resin is required which is to meet certain specifications as to loss on heating, the exact endpoint may be determined by withdrawing samples of the resin from time to time during the operation. Such samples are heated to 500° F. and held at that temperature for 10 minutes and the loss on heating is determined. One varnish specification requires a resin with loss at 500° F. of not more than 5%. The exact endpoint will readily be determined by the use to which the particular batch of resin is to be put. The hardening apparatus and its condensing system may be arranged so that after the hardening process is under way a vacuum is automatically produced. If this is done the oils can be distilled with temperatures 12 to 15° lower than the normal temperatures at atmospheric pressure. When distillation has reached the desired point the hot resin may be dumped by opening a valve 35 at the bottom of the still and the resin may then be collected in shallow pans for cooling. The hard resin is then broken into pieces of convenient size for storage or shipment.

The resin thus produced is a light amber in color, substantially completely insoluble in water, lower alcohols and acetone, substantially completely soluble in most hydrocarbon solvents and in drying and semi-drying oils, and produces a clear durable coating film when made into varnish or coating materials. The resin is substantially non-acid in reaction, and does not retard the drying of linseed oil.

Resins produced according to this general process may be controlled as to yield and characteristics in various ways, for example, control of resins of this character by the use of varying amounts of catalyst, has been described in the copending application, Serial No. 518,132, cited above. It is also found that the type of resin produced is materially affected by the character and proportions of starting materials used.

In accordance with the present invention, a predetermined type of resin having desired characteristics, may be produced by the choice of starting materials of controlled proportions and character. This may be done by determining to a considerable extent the chemical constituents of various fractions of cracked distillate, and also the particular type of resin obtainable from such fractions of cracked distillate. In producing a desired resin, suitable proportions of a particular fraction or mixture of fractions of cracked distillate may then be used alone or mixed with the desired proportion of relatively pure hydrocarbon compounds.

Thus the fraction of cracked distillate described herein as fraction No. 1, when used alone, produces a light colored resin which may be used in varnish making, but when so used produces a coating film somewhat less durable than is required for certain coating purposes. It is also found that a high proportion of white insoluble organic polymer is produced from this fraction. Accordingly, a proportion of relatively pure olefine, such as amylene, may advantageously be added to fraction No. 1, if it is desired to increase the yield of soluble resin and to decrease the proportion of insoluble polymer.

It is to be understood that an olefine, as referred to in the present specification and claims, is an unsaturated hydrocarbon having only one double bond.

The fraction of cracked distillate described herein as fraction No. 4, produces a tougher resin than is produced from fraction No. 1, and the resin makes a more durable varnish. However, the resin and coating materials produced from it are somewhat darker in color, and there is a tendency to produce cloudy varnish films.

By combining fraction No. 1 and fraction No. 4 in varying proportions, a predetermined type of resin can be produced. Thus, if a very light colored resin is desired, a larger proportion of fraction No. 1 is employed; if color is less important and better durability of the coating film is wanted, a larger proportion of fraction No. 4 is used.

In the same manner, the characteristic properties of resins produced from any of the relatively pure resin-forming hydrocarbons mentioned above, may be secured by adding an effective proportion of the hydrocarbon or mixture of hydrocarbons desired, to the starting materials to be used in resin production. The proportion necessary to produce a resin of desired properties, may be determined by test, which may conveniently be carried out in laboratory quantities.

It has previously been considered desirable to keep the proportion of resin or soluble polymer as high as possible, while reducing the proportion of insoluble polymer produced in the resin reaction. We have now found that a useful soluble resin may be produced from the insoluble polymer referred to above. This insoluble polymer has been found to be produced when diolefines and olefines are reacted together in the manner described herein. That is, when diolefines and olefines, or other unsaturated hydrocarbon compounds, are reacted together in the manner described, one of the products formed is a soluble resinous product of the general character of the resins described herein. Another product formed during this reaction is a white insoluble powder of high molecular weight, conforming roughly to the same empirical formula as the soluble resin, but totally unlike a resin in appearance and properties.

In the resin forming process described above, this insoluble polymer may be obtained from the solid residue which is filtered off from the neutralized resinous reaction product. This insoluble organic polymer has heretofore been considered a worthless by-product of the resin-making process. The solid granular residue may be freed from inorganic material, such as aluminum chloride, by repeated digesting and washing with hydrochloric acid and water. For example, 10% hydrochloric acid may be effectively used. If the insoluble polymer is the product primarily desired, the polymerized mixture may be filtered and washed without neutralization. When this method is followed, the hydrocarbon aluminum chloride complex which is formed on the addition of aluminum chloride to unsaturated hydrocarbons, is not decomposed and most of the aluminum chloride passes into the filtrate. Consequently the washing required to purify the insoluble polymer is greatly reduced.

After such washing there remains on drying at low temperatures, a white granular organic polymer which on combustion appears to conform to the formula $(C_5H_8)_x$. This polymer is characterized by its extreme insolubility, having been found insoluble in the solvents tried, except that it appears to be very slightly soluble in nitrobenzene and some of the higher amines. Strong acids decompose the product, and phenols appear to react with it giving a reddish violet coloration, with subsequent decomposition. This polymer apparently begins to depolymerize when heated to temperatures of the order of 115° C. to 120° C. The powdered mass at first contracts on heating, becoming somewhat spongy and rubbery in appearance and changing to a brown color, small globules of oil being formed. On continued heating to about 300° C. the mass begins to fuse, slowly changing to a dark fused mass, the change being accompanied by some foaming. The dark fused mass on cooling solidifies to a transparent dark resin which is soluble in most hydrocarbons such as benzol, gasoline, naphtha and the like, and chlorinated hydrocarbon solvents, and in drying oils, such as linseed oil. When this resin was heated on an aluminum plate, a glassy, very hard, black resin was obtained.

When the described white insoluble polymer is heated to a temperature of the order of 300° C. out of contact with air, as in a bomb, a transparent light amber-colored resin is produced which solidifies on cooling. The resin so formed is soluble in hydrocarbon solvents and in drying oils. The melting point of the resin formed from the insoluble polymer is in most cases above 150° C. Iodine value has been found to be high, usually above 120, and acid value low, usually below 2.5. This resin is suitable for making coating materials and for molding purposes.

While the forms of invention herein described constitute preferred embodiments of the invention, it is to be understood that the invention is not limited to these precise forms and that changes may be made therein without departing from the scope of the invention which is defined in the appended claims.

What is claimed is:

1. As a new product, a synthetic hydrocarbon resin obtained from an insoluble polymer produced during the reaction of a fraction of cracked petroleum distillate containing diolefines and olefines in the presence of a metallic halide catalyst, the insoluble polymer being a white gelatinous mass substantially completely insoluble in hydrocarbon solvents, and the hydrocarbon resin obtained directly therefrom by application of heat being substantially completely soluble in hydrocarbon solvents, and in drying oils.

2. The method in the production of a synthetic resin, comprising the steps of reacting a fraction of cracked petroleum distillate comprising a mixture of unsaturated hydrocarbons containing diolefines and olefines with a metallic halide catalyst so as to produce a white hydrocarbon polymer which is insoluble in hydrocarbon solvents, separating such insoluble polymer, washing the polymer to purify and remove inorganic materials, heating the purified insoluble polymer to its fusion point, and continuing such heating until a resin is produced which is readily soluble in hydrocarbon solvents.

3. As a new product an unsaturated hydrocarbon resin formed from a mixture of unsaturated hydrocarbons consisting of a fraction of cracked petroleum distillate boiling below 50° C., and a fraction of cracked petroleum distillate boiling between 125° C. and 180° C.

4. A method in the production of a synthetic resin which comprises the steps of reacting in the presence of a metallic halide catalyst a mixture consisting of hydrocarbons having boiling points below 50° C. and hydrocarbons having boiling points between 125° C. and 180° C. present in a fraction of cracked petroleum distillate, the proportion of hydrocarbons having boiling points below 50° C. being greater so as to produce an unsaturated hydrocarbon resin light in color and capable of producing a clear varnish film.

5. In the manufacture of a resin, in which unsaturated hydrocarbons present in cracked petroleum distillate are reacted in the presence of a metallic halide catalyst to form a resinous reaction product, and the reacted mass is then treated with a neutralizing agent, the method which comprises mixing the reacted mass and the neutralizing agent in such manner as to provide at all times a substantial excess of neutralizing agent in contact with the reacted mass.

6. In the manufacture of a resin, in which unsaturated hydrocarbons present in cracked petroleum distillate are reacted in the presence of a metallic halide catalyst to form a resinous reaction product, and the reacted mass is then treated with a neutralizing agent, the method in which the reacted mass and neutralizing agent are simultaneously introduced into an agitation zone, an excess of neutralizing agent being at all times present during the neutralizing process.

7. The method in the production of a synthetic resin comprising the steps of reacting a mixture of unsaturated hydrocarbons containing diolefines and olefines in the presence of a metallic halide catalyst to produce a hydrocarbon polymer insoluble in hydrocarbon solvents, separating such insoluble polymer from soluble material, and heating such separated insoluble polymer to its fusion point out of contact with air, to produce a clear amber colored resin which is substantially completely soluble in hydrocarbon solvents.

8. The method in the production of a synthetic resin, comprising the steps of reacting a fraction of cracked petroleum distillate comprising a mixture of unsaturated hydrocarbons containing diolefines and olefines with aluminum chloride so as to produce a white hydrocarbon polymer which is insoluble in hydrocarbon solvents, separating such insoluble polymer, washing the polymer to purify and remove inorganic materials, heating the purified insoluble polymer to its fusion point, and continuing such heating until a resin is produced which is readily soluble in hydrocarbon solvents.

9. A method in the production of a synthetic resin which comprises the steps of mixing solely hydrocarbons having boiling points below 50° C., and hydrocarbons having boiling points between 125° C. and 180° C., present in a fraction of cracked petroleum distillate, the proportion of hydrocarbons having boiling points below 50° C. being the greater, reacting together such mixture of hydrocarbons in the presence of a metallic halide catalyst so as to produce a relatively high proportion of a white insoluble organic polymer, and heating the insoluble polymer to produce a resin.

10. The method in the production of a synthetic resin comprising the steps of reacting a mixture of unsaturated hydrocarbons containing diolefines and olefines in the presence of aluminum chloride to produce a hydrocarbon polymer insoluble in hydrocarbon solvents, separating such insoluble polymer from soluble material, and heating such separated insoluble polymer to its fusion point out of contact with air, to produce a clear amber colored resin which is substantially completely soluble in hydrocarbon solvents.

11. In the manufacture of a synthetic resin from a fraction of cracked petroleum distillate the method which comprises removing the fraction boiling between 50° C. and 125° C. from said fraction of cracked petroleum distillate, diluting the remaining fraction with a hydrocarbon solvent for the resinous reaction product, the solvent being chemically inert with respect to a metallic halide catalyst, and reacting the diluted fraction in the presence of a metallic halide catalyst to form a resinous reaction product.

12. The method in the production of unsaturated hydrocarbon resins by reaction of a fraction of cracked petroleum distillate with a metallic halide catalyst to produce a resinous product and an insoluble hydrocarbon polymer, which comprises increasing the yield of resinous product from a fraction of cracked petroleum distillate relatively low in olefine content, by mixing a substantially pure olefine with such fraction of cracked distillate, and then reacting the mixture in the presence of a metallic halide catalyst to produce an increased yield of a resinous product and a decreased yield of insoluble hydrocarbon polymer.

13. A method in the production of a synthetic resin which comprises the steps of mixing solely hydrocarbons having boiling points below 50° C., and hydrocarbons having boiling points between 125° C. and 180° C., present in a fraction of cracked petroleum distillate, the proportion of hydrocarbons having boiling points between 125° C. and 180° C. being the greater, and reacting together such mixture of hydrocarbons in the presence of a metallic halide catalyst so as to produce a durable and tough resin.

14. As a new product, a synthetic hydrocarbon resin obtained from an insoluble polymer produced during the reaction of a fraction of cracked petroleum distillate containing olefines and diolefines in the presence of a metallic halide catalyst, the insoluble polymer being a white gelatinous mass substantially completely insoluble in hydrocarbon solvents, and the hydrocarbon resin obtained directly therefrom without addition of other reacting materials being substantially completely soluble in hydrocarbon solvents and in drying oils.

CHARLES A. THOMAS.
WILLIAM H. CARMODY.